May 25, 1926.
C. D. REED
1,586,382
CONVEYER FOR BAKERS' OVENS
Original Filed Dec. 9, 1921
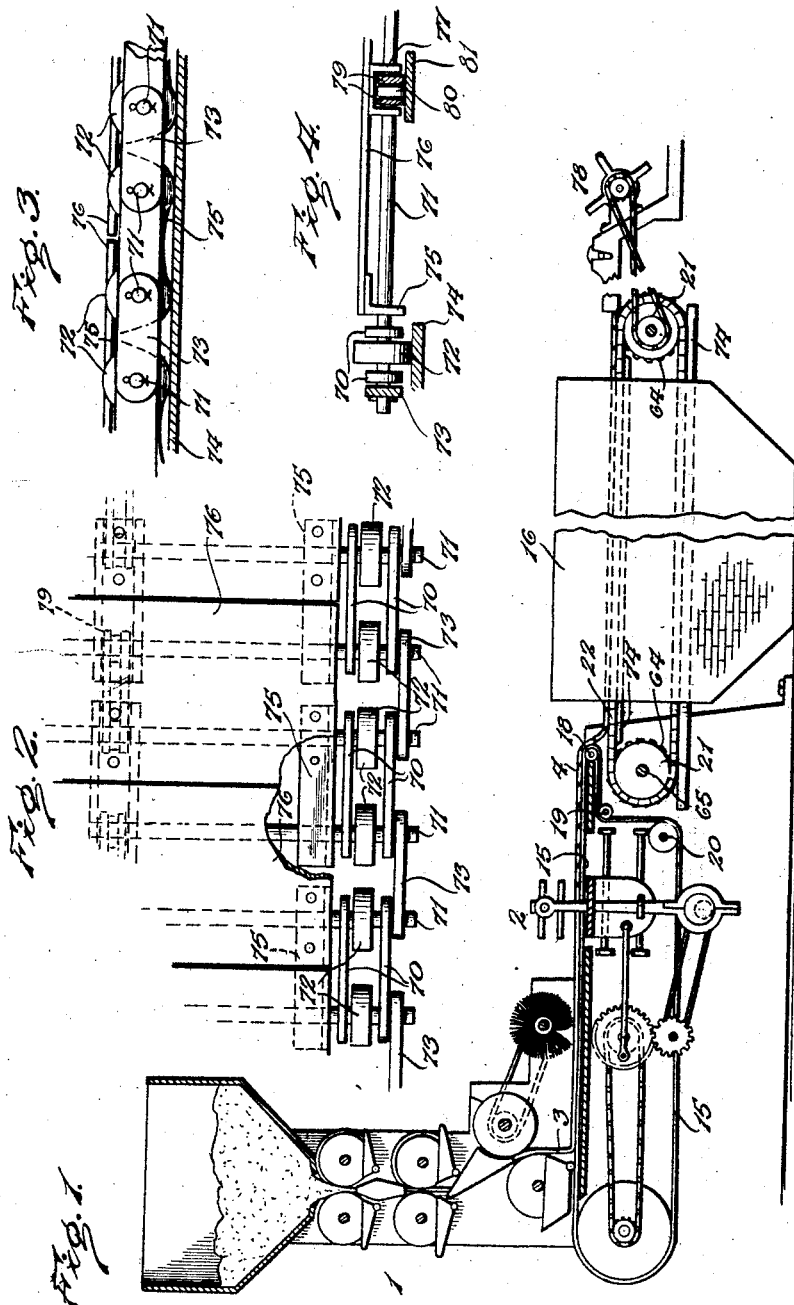
Inventor
C. D. Reed.
By
Lacey & Lacey, Attorney Patented May 25, 1926.

1,586,382

UNITED STATES PATENT OFFICE.

CLARENCE D. REED, OF PORTLAND, OREGON.

CONVEYER FOR BAKERS' OVENS.

Original application filed December 9, 1921, Serial No. 521,170. Divided and this application filed March 9, 1925. Serial No. 14,200.

This application is a division of an application filed by me December 9, 1921, Serial No. 521,170, the object of the present invention being to provide means whereby a continuous sheet of dough, marked for division into units of a desired size and form, will be carried through a baker's oven and firmly supported while passing therethrough. The invention is illustrated in the accompanying drawing and will be hereinafter fully set forth.

In the drawing:—

Figure 1 is a view, partly in side elevation and partly in longitudinal section, of an apparatus embodying the invention;

Fig. 2 is a detail plan view of the endless pan conveyer;

Fig. 3 is a detail edge view of said conveyer, and

Fig. 4 is a detail section of the same.

In the drawing, at 1 is indicated a dough-sheeting mechanism and at 2 a cutting or indenting mechanism by which the sheet of dough is indented or partly cut into units of the size and shape desired for the finished cakes or crackers, 3 denoting the sheet of dough as it passes to the cutting or indenting mechanism and 4 the indented sheet. The sheet of dough is carried toward the oven by the upper run of an endless conveyer apron 15, the bight of said conveyer adjacent the oven 16 being so guided and supported by idlers 18, 19 and 20 as to define a space below the delivery point to accommodate the driving gears and support for the pan conveyer 22 so that the dough, upon leaving the conveyer 15, will be received by the conveyer 22, and cannot drop between the two conveyers.

The oven 16 is preferably of brick and it should be of such length that, when the dough emerges from the delivery end thereof, it will be thoroughly baked. The oven may be heated by gas, oil, electricity or any other desired or preferred manner and the dough, after having been shaped by the cutters, is carried through the oven by an endless chain of pans. The pan conveyer 22 is supported in its ends or bights by drums 21 which are constructed with spurs or teeth 64 adapted to enter the links of the conveyer 22 and thereby impart motion to the same. The rear drum 21 has its shaft or axle 65 extended beyond the side of the main frame and equipped with a gear element, not shown, operatively connected with a source of motion whereby motion may be imparted to the said shaft. It is to be understood that the conveyers 15 and 22 may be driven in a step by step manner or continuously, as preferred.

As shown in Figs. 2, 3 and 4, the conveyer chains 22 consist of pairs of links 70 which are pivotally mounted at their ends upon spindles or axles 71 and between the ends of which rollers 72 are mounted upon said spindles. Each pair of links 70 is connected with the adjacent pairs of links by connecting links 73 so that a continuous chain is produced which may pass readily around the sprockets of the drums 21 and, to prevent sagging of these chains between the drums, I provide tracks 74 which extend through the furnace longitudinally thereof and may be of any suitable form. At the inner sides of the inner links 70, I secure to the spindles 71, blocks 75 which are disposed longitudinally of the chains and in staggered relation to the links 73, and it will be readily understood, of course, that this construction is duplicated at the two sides of the conveyer, the blocks 75 having secured to their upper sides, at that end which is the forward end when the blocks are in the upper run of the conveyer, the rear end portions of transverse plates 76 which constitute pans and upon which the dough is received from the conveyer 15. The forward edges of the several pans or plates project over the ends of the preceding blocks 75 but are not secured thereto so that, while passing along the tracks 74, the pans will be in a horizontal position and will be supported by the ends of successive blocks but may readily accommodate the various angular positions assumed by the several parts in passing around the supporting and actuating drums. These pans are of such dimensions that their transverse edges will be very close together and a practically unbroken surface will be presented to the sheet of dough so that it will be properly supported in its passage through the oven. Should the oven be of great width and the plates or pans 76 of corresponding size, an intermediate conveyer chain may be connected with the pans or plates 76 at the centers of the same so that sagging of the chain or conveyer under the weight of the dough will be avoided. This intermediate chain may consist of short inverted channels 77 secured to the pans and engaged with the spindles 71 in the same manner as the blocks 75 are secured and arranged, and links, indicated at 79, connecting the spindles in the same manner as the links 73 connect them. Rollers 80 are mounted on the spindles to run on a central track 81 which may be supported in any convenient manner from the side walls of the oven.

By referring to Figs. 2 and 3, it will be noted that each block 75 spans and is carried by two axles or spindles 71 which are common to the two chains and the blocks are disposed immediately adjacent the inner sides of the chains. The pans are secured rigidly to the blocks and are so arranged that about one-half of each block is covered by the pan secured thereto and the rest of the block is covered by the next following pan, the forward half of each pan, however, being free of the blocks. The pans are thus firmly supported so that, while they may easily pass around the drums at the bights of the conveyer, they will lie horizontally on both horizontal runs of the chains with their opposed edges practically meeting and their outer surfaces flush, the sheet of dough being, consequently, supported without a break.

As previously stated, the chain conveyer should be of such length that during the passage of the dough through the oven it will be thoroughly baked. The delivery end of the conveyer extends some distance beyond the front or delivery end of the oven so that the hot crackers or cookies will be permitted to cool before handling of the same by packers becomes necessary, and before being acted upon by the breaker or chipper which is shown at 78.

Dropping from the forward bight of the conveyer 15, the perforated or divided dough is received upon the several plates or pans 76 and then carried directly into and through the oven, the travel of the pan conveyer being at the same speed as the conveyer 15 so that there will be no breaking or stretching or interruption to the transfer of the dough from the dough conveyer to the pan conveyer. The cooked units are carried through a chute to a breaker 78 and this chute should be of such length that substantially all the heat will be given off from the cooked articles during their travel therethrough. The breaker automatically separates the rows of crackers and the separated rows pass to a receiver which may contain an endless conveyer to carry the finished articles to the packers, or it may be a table from which the articles may be gathered by hand.

The links 73, shown at the outer extremities of the spindles, may be duplicated between the pans and the inner links 70, and the inner links 70 may be omitted, if preferred, when the links 73 are thus duplicated.

Having thus described the invention, I claim:—

Apparatus for the purpose set forth comprising an oven, tracks extending longitudinally through the oven, a conveyer arranged longitudinally within the oven and consisting of parallel transverse axles, alined blocks carried by the axles near the ends thereof and connecting them in pairs, links connecting the axles in pairs at the outer sides of the blocks, other links connecting successive pairs of axles, rollers on all the axles arranged to run upon the tracks in the oven, and flat pans secured to and extending between corresponding blocks, the rear edge of each pan being in advance of the rear ends of the blocks to which it is secured and the forward portion of each pan overlapping and adapted to rest freely upon the rear portions of the blocks in advance of the blocks to which it is secured, and the front and rear edges of all the pans being in the same plane with the surfaces of the pans flush in both horizontal runs of the chains whereby the pans in the upper run may support a continuous sheet of material.

In testimony whereof I affix my signature.

CLARENCE D. REED. [L. S.]